(12) United States Patent
Clark et al.

(10) Patent No.: US 12,164,910 B2
(45) Date of Patent: Dec. 10, 2024

(54) VEHICLE SOFTWARE COMPATIBILITY

(71) Applicant: FORD GLOBAL TECHNOLOGIES, LLC, Dearborn, MI (US)

(72) Inventors: Karl Nathan Clark, Belleville, MI (US); Jason Michael Miller, Woodhaven, MI (US); John Caradillo, Windsor (CA); Vijayababu Jayaraman, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 119 days.

(21) Appl. No.: 17/714,000

(22) Filed: Apr. 5, 2022

(65) Prior Publication Data

US 2023/0315440 A1  Oct. 5, 2023

(51) Int. Cl.
*G06F 8/71* (2018.01)
(52) U.S. Cl.
CPC ..................... *G06F 8/71* (2013.01)
(58) Field of Classification Search
CPC ........................................................ G06F 8/71
See application file for complete search history.

(56) References Cited

U.S. PATENT DOCUMENTS

| | | | |
|---|---|---|---|
| 8,019,487 B2 * | 9/2011 | Goto ........................ | G06F 8/654 701/1 |
| 8,707,255 B2 | 4/2014 | Niggemann et al. | |
| 9,639,344 B2 * | 5/2017 | Rockwell .................. | G06F 8/65 |
| 10,416,985 B2 | 9/2019 | Madrid et al. | |
| 10,514,900 B2 * | 12/2019 | Teraoka .................... | G06F 11/00 |
| 10,552,143 B2 * | 2/2020 | Nakano .................. | B60R 16/023 |
| 10,782,955 B2 | 9/2020 | Madrid et al. | |
| 10,977,879 B2 | 4/2021 | Antonsson et al. | |
| 11,528,330 B2 * | 12/2022 | Golgiri ................ | B60W 50/14 |
| 2018/0150290 A1 * | 5/2018 | Matsuda ............. | G06F 11/1433 |
| 2019/0050219 A1 * | 2/2019 | Seki ......................... | H04L 67/12 |
| 2019/0129710 A1 * | 5/2019 | Izumi ....................... | B60R 16/02 |
| 2019/0265966 A1 * | 8/2019 | Shimomura .......... | B60R 16/023 |
| 2019/0278582 A1 * | 9/2019 | Miyake .................. | B60R 16/023 |
| 2019/0286580 A1 * | 9/2019 | Ouchi ........................ | G06F 9/54 |
| 2020/0110406 A1 * | 4/2020 | Krishnamurthy .... | G05D 1/0061 |
| 2020/0174780 A1 * | 6/2020 | Gintz ......................... | G06F 8/66 |
| 2020/0274927 A1 * | 8/2020 | Richmond ........ | H04L 12/40169 |
| 2021/0271962 A1 * | 9/2021 | Abhishek ................ | G06F 17/18 |
| 2021/0311724 A1 * | 10/2021 | Ishikawa ................. | H04L 67/34 |
| 2021/0389939 A1 * | 12/2021 | Kono .................... | H04L 67/125 |
| 2022/0012048 A1 * | 1/2022 | Fukuyo .................. | G06F 8/454 |
| 2022/0179643 A1 * | 6/2022 | Harata ...................... | G06F 8/65 |
| 2022/0283797 A1 * | 9/2022 | Nagamitsu ........... | G07C 5/0816 |
| 2022/0283799 A1 * | 9/2022 | Hamasaki ................ | G06F 8/61 |
| 2022/0318003 A1 * | 10/2022 | Nagamitsu ............... | G06F 8/65 |
| 2022/0413832 A1 * | 12/2022 | Itatsu ........................ | G06F 8/65 |
| 2023/0179659 A1 * | 6/2023 | Go .......................... | H04L 12/46 709/201 |

* cited by examiner

*Primary Examiner* — Douglas M Slachta
(74) *Attorney, Agent, or Firm* — Joseph Zane; Brooks Kushman P.C.

(57) ABSTRACT

Tracking controller configuration is provided. Each ECU of a plurality of ECUs is queried for feature codes indicative of elements of functionality implemented by the respective ECU. Each of the feature codes corresponds to a target quantity of ECUs involved in implementing the functionality. An alert is indicated responsive to the querying returning a different quantity of ECUs implementing the functionality than the target quantity.

18 Claims, 5 Drawing Sheets

| Program Information | | | Feature Map | | | ECU Mapping | | | | |
|---|---|---|---|---|---|---|---|---|---|---|
| Program | Model Year | Feature Code | Feature Name | Buildable Code | Affected Controllers | ECU1 | ECU2 | ECU3 | ECU4 | ECU5 |
| P122 | 2022 | F00423 | Phone Integration 1 | Navigation | ECU1, ECU4, ECU5 | X | | | X | X |
| P122 | 2022 | F00433 | Phone Integration 2 | Navigation | ECU1, ECU4, ECU5 | X | | | X | X |
| P122 | 2022 | F10235 | Power Outlets | Power1 | ECU1, ECU2, ECU3, ECU4, ECU5 | Power1 | X | Power1 | X | Power1 |
| | | | | Power2 | ECU1, ECU2, ECU3, ECU4, ECU5 | Power2 | X | Power2 | X | Power2 |
| | | | | Power3 | ECU1, ECU2, ECU3, ECU4, ECU5 | Power3 | X | Power3 | X | Power3 |
| | | | | Power4 | ECU1, ECU2, ECU3, ECU4, ECU5 | Power4 | X | Power4 | X | Power4 |

FIG. 2

| ECU | Feature Code |
|---|---|
| Connectivity | RS-1A4 |
| Body | RS-1A4 |
| Powertrain | RS-1A4 |
| Radio | RS-1A4 |

| ECU | Feature Code |
|---|---|
| Connectivity | RS-2A5 |
| Body | RS-2A5 |
| HVAC | RS-2A5 |
| Powertrain | RS-2A5 |
| Radio | RS-2A5 |

VEHICLE SOFTWARE COMPATIBILITY

TECHNICAL FIELD

The illustrative embodiments generally relate to methods and apparatus for tracking vehicle configurations across the vehicle lifecycle.

BACKGROUND

To update a software version of a component of a vehicle, the vehicle may be driven to a dealership and serviced by a technician. The technician may utilize a system that tracks the individual software levels of every component in the vehicle as well as available software updates. The technician may manually apply the software updates indicated by the system and record any changes back into the system.

Over-the-air (OTA) software updates are a technique by which software of a vehicle may be updated via a wireless connection. Using an embedded modem or other wireless data connection to the vehicle, OTA updates allow software changes on vehicle electronic control units (ECUs) without a service visit.

SUMMARY

In a first illustrative embodiment, a system for tracking controller configuration is provided. The system includes ECUs and a central gateway. The central gateway is programmed to query each ECU of the ECUs for feature codes indicative of elements of functionality implemented by the respective ECU, each feature code corresponding to a target quantity of ECUs involved in implementing the functionality, and indicate an alert responsive to the query returning a different quantity of ECUs implementing the functionality than the target quantity.

In a second illustrative embodiment, a method for tracking controller configuration is provided. Each ECU of a plurality of ECUs is queried for feature codes indicative of elements of functionality implemented by the respective ECU. Each of the feature codes corresponds to a target quantity of ECUs involved in implementing the functionality. An alert is indicated responsive to the querying returning a different quantity of ECUs implementing the functionality than the target quantity.

In a third illustrative embodiment, a non-transitory computer-readable medium includes instructions for tracking controller configuration that, when executed by a central gateway in communication over one or more buses with a plural toy of ECUs, cause the central gateway to perform operations including to query each ECU of a plurality of ECUs for feature codes indicative of elements of functionality implemented by the respective ECU, each feature code corresponding to a target quantity of ECUs involved in implementing the functionality; and indicate an alert responsive to the query returning a different quantity of ECUs implementing the functionality than the target quantity.

BRIEF DESCRIPTION OF THE DRAWINGS

FIG. 2 illustrates an example of a feature dictionary of the vehicle illustrating further aspects of the feature codes.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present approach.

Designing software-enabled features is complex in the vehicle environment, as functionality may be distributed across many vehicle ECUs. Because ECU software may be independently updated OTA or in a service setting, it is important to ensure vehicle software compatibility throughout the full life cycle of the product. In addition to OTA software deployments, vehicles may experience ECU replacements from time to time due to repair, upgrade, hobbyist work, or other situations. When dealers or service stations replace ECUs, they may install the appropriate software and configuration parameters to ensure compatibility with other ECUs in the vehicle. However, some repairs may be performed using hardware compatible ECU from a donor vehicle, without an understanding that there could be a software incompatibility. Aspects of the disclosure relate to an approach to the validation of compatible vehicle software. This validation may be performed responsive to occurrence of the ignition cycle, in an example.

Figure 1:
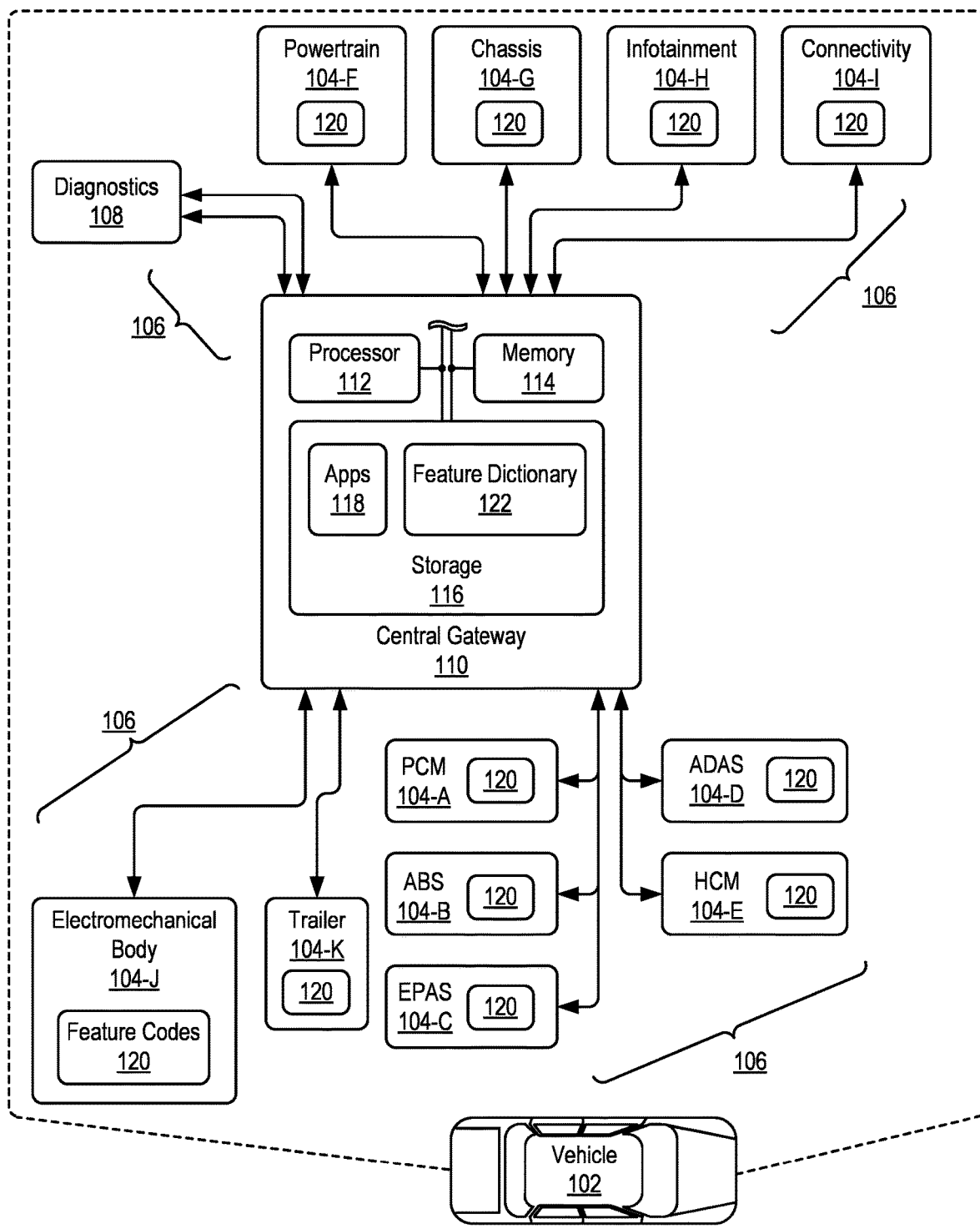
FIG. 1 illustrates an example system including a central gateway configured for use in tracking vehicle configurations across the vehicle lifecycle.

FIG. 1 illustrates an example system 100 including a central gateway 110 configured for use in tracking vehicle configurations across the vehicle lifecycle. The central gateway 110 may be connected to a plurality of ECUs 104 over one or more vehicle buses 106. The central gateway 110 may also include one or more diagnostic ports 108. The central gateway 110 may include a processor 112, a memory 114, and a storage 116 for applications and/or data. While an example system 100 is shown in FIG. 1, the example components as illustrated are not intended to be limiting. Indeed, the system 100 may have more or fewer components, and additional or alternative components and/or implementations may be used.

The vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors. In another example, the vehicle 102 may be a pure electric vehicle driven by electric motors only.

The vehicle 102 may include a plurality of ECUs 104 configured to perform and manage various vehicle 102 functions under the power of the vehicle battery and/or drivetrain. As depicted, the example vehicle ECUs 104 are represented as discrete ECUs 104-A through 104-H. However, the vehicle ECUs 104 may share physical hardware, firmware, and/or software, such that the functionality from multiple ECUs 104 may be integrated into a single ECU 104 or distributed across a plurality of ECUs 104. The vehicle ECUs 104 may include various vehicle 102 components configured to receive updates of associated software, firmware, or configuration settings.

As some non-limiting vehicle ECUs 104 examples: a powertrain control module (PCM) 104-A may be configured to control engine and transmission components; an antilock brake system (ABS) 104-B controller configured to control brake and traction control components; an electric power-assisted steering (EPAS) 104-C controller configured to control steering assistance and adjust pull or drift compensation functions; advanced driver assistance systems (ADAS) 104-D such as adaptive cruise control or automate braking; and a headlamp control module (HCM) 104-E configured to control light on/off settings. The ECUs 104 may also include other powertrain 104-F or chassis 104-G components, an infotainment system 104-H configured to support voice command and BLUETOOTH interfaces with the driver and driver carry-on devices (e.g., the SYNC system provided by Ford Motor Company of Dearborn, MI), a connectivity controller 104-I such as a telematics control unit (TCU) configured to utilize an embedded modem to access networked devices external to the vehicle 102, electromechanical body controllers 104-J such as window or lock actuators, and trailer controller 104-K components such as light control and sensor data to support connected trailers.

The vehicle bus 106 may include various methods of communication available between the vehicle ECUs 104. The vehicle bus 106 may also support communication between the central gateway 110 and the vehicle ECUs 104. As some non-limiting examples, the vehicle bus 106 may be a vehicle controller area network (CAN), an Ethernet network, or a media oriented system transfer (MOST) network. The CAN network or networks may be various types, including, but not limited to, high speed CAN (HS-CAN) having a data capacity of up to 500 kbps, mid-speed CAN (MS-CAN) having a data capacity of up to 125 kbps, and/or CAN flexible data rate (FD-CAN) having a data capacity of up to 2000 kbps or higher. It should be noted that the illustrated bus topology is merely an example, and other numbers and arrangements of vehicle buses 106 may be used. These vehicle buses 106 may be implemented as a series of segments of wiring. For instance, a vehicle bus 106 may include a plurality of segments of wiring from the central gateway 110 to an end location.

The vehicle 102 may further include diagnostic ports 108 that may be used by external devices to monitor the status of the vehicle 102. In an example, the diagnostic port 108 may be an on-board diagnostics (OBD) port connected to the vehicle bus 106. A user may connect a dongle, code reader, or other scan device to the diagnostic port 108, and may use the connection provided by the diagnostic port 108 to gain access to messages traversing the vehicle bus 106. Once connected, a user may utilize the connected scan device to capture diagnostic codes, monitor vehicle health, or, in some cases, adjust vehicle settings. Similar to the speed of HS-CAN, the CAN diagnostic ports 108 may support data capacity of up to 500 kbps. In another example, the diagnostic port 108 may be a diagnostic over Internet Protocol (DoIP) port 124, and may provide access to messages traversing the vehicle bus 106 via Ethernet rather than via the OBD standard. A DoIP port 124 may support a higher data rate than CAN, as Ethernet using TCP/IP 64-byte payload can support data rates of approximately 45 Mbps, and with 1460-byte payloads can support data rates of approximately 95 Mbps.

The central gateway 110 may be configured to provide an electrical interface between the vehicle buses 106 used to communicate within the vehicle 102. In an example, the central gateway 110 may be configured to translate signals and commands between CAN and/or in-vehicle Ethernet vehicle buses 106 connected to the central gateway 110. For instance, the central gateway 110 may support connection to up to ten CAN vehicle buses 106 and up to seven Ethernet vehicle buses 106. By supporting Ethernet in addition to CAN, the central gateway 110 may be able to provide support for higher-speed in-vehicle network communication, while still performing existing or legacy gateway functions within the vehicle 102.

As a specific non-limiting example, the central gateway 110 may be connected to the powertrain 104-F components over a HS-CAN vehicle bus 106; to the chassis 104-G components, safety systems and a cluster over a second HS-CAN vehicle bus 106; to the infotainment system 104-H over a third HS-CAN vehicle bus 106; to the connectivity 104-I and Ethernet security backup systems over a fourth HS-CAN vehicle bus 106; to the electromechanical body controllers 104-J over a first MS-CAN bus; to the trailer controller 104-K and/or nodes readily accessed from the exterior of the vehicle 102 over a second MS-CAN vehicle bus 106; to a diagnostic port 108 over first and second diagnostic data vehicle bus 106 connections; to the PCM 104-A, ABS 104-B, EPAS 104-C, and other controllers over a first FD-CAN vehicle bus 106; and to the ADAS 104-D, HCM 104-E and other controllers over a second FD-CAN vehicle bus 106. For instance, the infotainment system 104-H, connectivity 104-I, cluster 104-L, heads-up display 104-M, and ADAS 104-D are each connected to the central gateway 110 via separate 2-wire 100 Mbsp Ethernet vehicle buses 106. In yet another example the heads-up display 104-M may be integrated with the cluster 104-L.

The central gateway 110 may be further configured to provide computing functionality in support of the domain CAN messaging of the vehicle 102. For instance, the central gateway 110 may include one or more processors 112 configured to perform instructions, commands, and other routines in support of the processes described herein. In an example, the central gateway 110 may be configured to execute instructions of applications 118 loaded to a memory 114 of the central gateway 110 from a storage medium 116 of the central gateway 110. The applications 118 may include software code programmed to support the operation of the central gateway 110 discussed in detail herein.

For instance, the applications 118 may include software code to facilitate tracking vehicle configurations across the vehicle lifecycle, as discussed in detail herein. The computer-readable storage medium 116 (also referred to as a processor-readable medium or storage) includes any non-transitory medium (e.g., a tangible medium) that participates in providing instructions or other data that may be read by the processor 112 of the central gateway 110. Computer-executable instructions may be compiled or interpreted from computer programs created using a variety of programming languages and/or technologies, including, without limitation, and either alone or in combination, Java, C, C++, C #, Objective C, Fortran, Pascal, Java Script, Python, Perl, and structured query language (SQL). As one specific example, the central gateway 110 may be provisioned with at least 128 megabytes of random-access memory (RAM), as well as 2-4 cores of processor 112 for processing power to enable various computing tasks.

A feature of a vehicle 102 may refer to a discrete element of hardware and/or software functionality. Examples features may include a moonroof, heated seats, backup camera, navigation system, BLUETOOTH connectivity, remote start, blind spot monitoring, etc. Each feature of the vehicle 102 may be assigned to a unique engineering feature code 120. These feature codes 120 may vary according to each version and variant of the feature. Each of the feature codes 120 that are implemented by an ECU 104 may be specified in a non-transitory memory of the respective ECU 104.

The central gateway 110 may be configured to utilize an application 118 to track the full list of features installed into the vehicle 102. To do so, the central gateway 110 may maintain a feature dictionary 122 including a compilation of allowable feature code 120 combinations across the ECUs 104. In some examples, the feature dictionary 122 may be constructed by performing a query of the ECUs 104 for their version information. In another example, the feature dictionary 122 may be transferred to the central gateway 110 according to a build sheet of the vehicle 102 that specifies the correct equipment for the vehicle 102 (e.g., pursuant to design intent). In yet a further example, the feature dictionary 122 may be downloaded to the central gateway 110 (e.g., as original software, as a software update, etc.), and may include a list of multiple allowable combinations of feature codes 120 that may be installed into the vehicle 102.

Vehicle software compatibility may be performed by the application 118 of the central gateway 110. In an example, the application 118 may query the ECUs 104 over the one or more vehicle buses 106 for feature codes 120 embedded within the configuration sections of the ECUs 104, and may compare that queried information to the allowable combination or combinations specified by the feature dictionary 122 of the central gateway 110.

The application 118 may be programmed to ensure that the same set of feature codes 120 from the ECUs 104 are contained within the feature dictionary 122 of the central gateway 110. If a rogue ECU 104 with incompatible software is installed, that ECU 104 may not be aligned with the rest of vehicle 102. This may be evident by the feature codes 120 for that ECU 104 not matching the feature codes 120 of the feature dictionary 122.

FIG. 2 illustrates an example of a feature dictionary 122 of the vehicle 102 illustrating further aspects of the feature codes 120. Each feature code 120 may be mapped to a vehicle program 202. A vehicle program 202 may refer to a buildable combination of a set of features referred to by the feature codes 120. The vehicle programs 202 may also be identified by identifiers specific to the particular vehicle programs 202. The program information may also include a model year 204 or other temporal indication of the build, as programs may vary by model year 204, job, etc.

Some features may be mandatory, or standard, meaning they are generally installed to the vehicle 102. These features may be defined as a feature mapping between the feature code 120 for that feature and a generic vehicle program 202 code. Other features may be optional but orderable features. These optional features may include a mapping of the optional feature code 120 to a buildable code 206. The feature mapping may also include a human readable feature name 210 to aid in understanding of the information in feature dictionary 122. Each of the feature codes 120 may be mapped to affected controllers 212 required to implement the feature. The feature dictionary 122 may also include an ECU mapping 214 of the hardware and software part numbers that are required, as well as configuration parameters that are required. For instance, as shown, different versions of the power outlets feature may require different software configurations of vehicle ECUs 104 (e.g., Power1, Power2, Power3, Power4, as illustrated).

Figure 3A:
FIG. 3A illustrates an example of feature codes for a first version of a feature across the ECUs of the vehicle.

FIG. 3A illustrates an example of feature codes 120 for a first version of a feature across the ECUs 104 of the vehicle 102. In an example, the feature may be a remote start feature RS-1A for the vehicle 102. As shown, the example remote start feature may involve connectivity, body, powertrain, and radio ECUs 104 of the vehicle 102. Because the feature involves four of the ECUs 104, the feature code 120 may also encode this information (e.g., as RS-1A4 as shown).

It should be noted that in other examples the quantity of ECUs 104 to have the feature code 120 may be stored in another portion of the feature dictionary 122 or in another data structure, as opposed to being embedded information within the feature code 120 itself. For instance, the central gateway 110 may utilize the feature dictionary 122 to determine the count of ECUs 104 using the affected controllers 212 or ECU mapping 214 information. However, it should also be noted that if the quantity is included in the feature codes 120, then the affected controllers 212 and ECU mappings 214 information may not be required to be saved to the central gateway 110, thereby utilizing less of the storage 116.

Figure 3B:
FIG. 3B illustrates an example of feature codes for a second version of the feature across the ECUs of the vehicle.

FIG. 3B illustrates an example of feature codes 120 for a second version of the feature across the ECUs 104 of the vehicle 102. This second version of the remote start feature (RS-2A) may include cabin pre-conditioning. To enable this additional functionality, the second version of the remote start feature may additionally involve software of the heating, ventilation, and air conditioning (HVAC) ECU 104. As shown, the revised version now involves connectivity, body, HVAC, powertrain, and radio ECUs 104 of the vehicle 102. Because the updated feature involves five of the ECUs 104, the feature code 120 may also encode this (e.g., as RS-2A5 as shown).

As noted above, the central gateway 110 may query the ECUs 104 for their feature codes 120. This information may be analyzed to identify issues. To use the example of FIG. 3A, the central gateway 110 may confirm that the RS-1A code is seen and that no other version(s) of the same code is also seen (e.g., no instances of RS-2A, RS-3A, etc.). As another confirmation, the central gateway 110 may also confirm that the quantity of ECUs 104 returning the feature code 120 is correct. Continuing with the example of FIG. 3A, the central gateway 110 may confirm that there are four ECUs 104 that return the code RS-1A.

If the configuration is incorrect, the central gateway 110 may be configured to provide an alert indicating the issue. Moreover, as the issue is connected to the verification of a feature code 120, the central gateway 110 may additionally indicate in the alert which features are implicated by the issue. The alert may indicate, for example, mismatched versions of software for a feature and/or am incorrect quantity of ECUs 104 for a feature. The central gateway 110 may utilize ECUs 104 of the vehicle 102 provide the alert in the human machine interface (HMI) of the vehicle 102, to a mobile device in communication with the vehicle 102, to a remote server over a network, to a server of a service facility, to a diagnostic device connected to the vehicle 102 via the diagnostic port 108, etc. In another example, if compatible software is available to address the alert, then that software may be automatically installed (e.g., to install a valid set of features per the feature dictionary 122). For instance, if one of the ECUs 104 has an incorrect or missing software version, then the correct version may be installed to that ECU 104.

Figure 4:
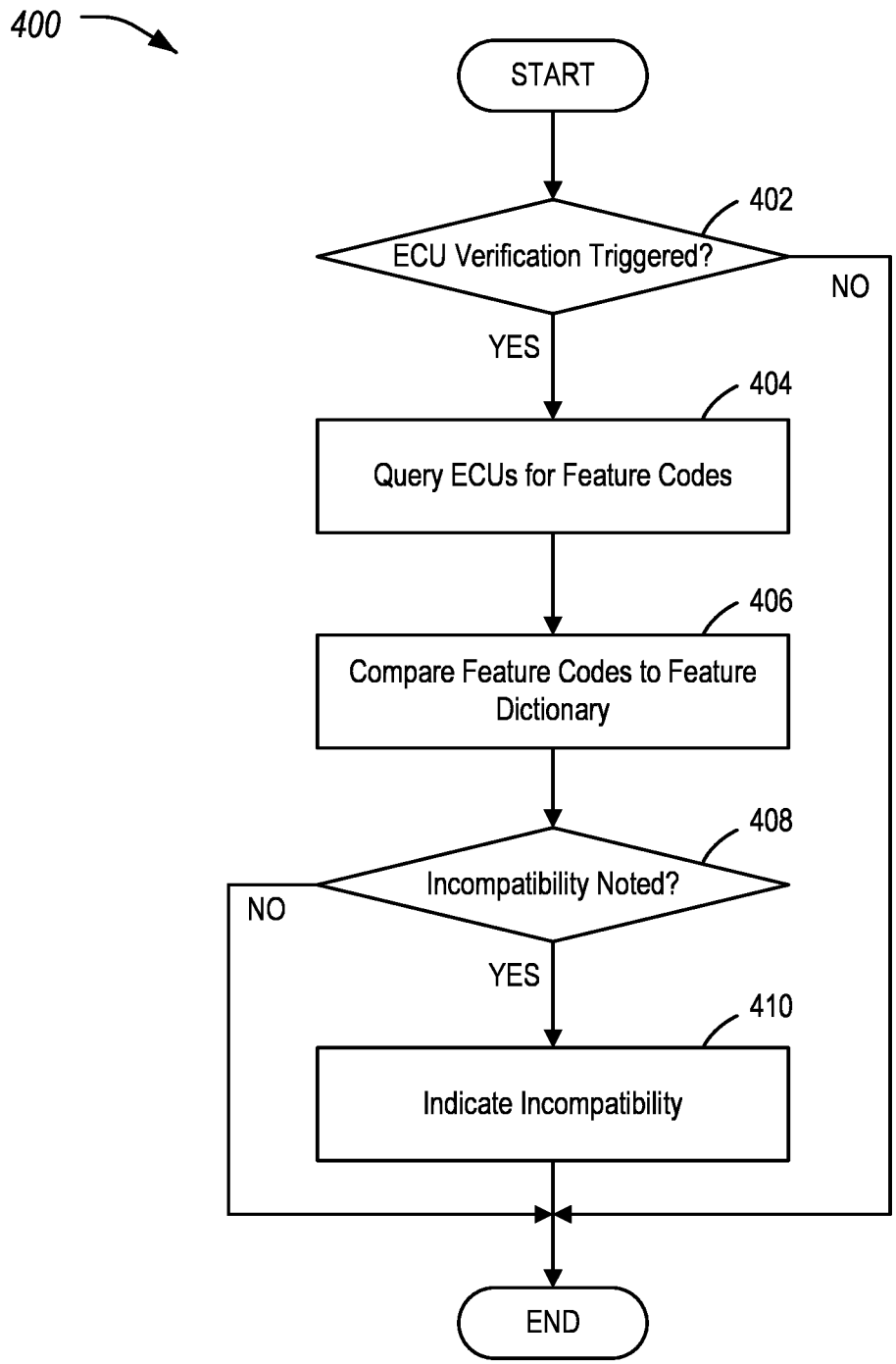
FIG. 4 illustrates an example process for tracking vehicle configurations across the vehicle lifecycle.

FIG. 4 illustrates an example process 400 for tracking vehicle 102 configurations across the vehicle 102 lifecycle. In an example, the process 400 may be performed by the central gateway 110 of the vehicle 102 in the context of the system 100.

At operation 402, the central gateway 110 determines whether ECU 104 verification is triggered. In an example, the verification may be triggered responsive to a user turning on the vehicles 102 (e.g., responsive to a key-on cycle). In another example, the verification may be triggered by selection of a verification function from the HMI of the vehicle 102, where the function informs the application 118 of the central gateway 110 to perform the verification. In yet another example, the verification may be triggered by a tool connected to the diagnostic port 108 sending a verification message to the central gateway 110 for processing by the application 118 to perform the verification.

At operation 404, the central gateway 110 queries the ECUs 104 for feature codes 120. In an example, the application 118 may query the ECUs 104 over the one or more vehicle buses 106 for feature codes 120 embedded within the configuration sections of the ECUs 104.

At operation 406, the central gateway 110 compares the feature codes 120 to the information in the feature dictionary 122. In an example, the central gateway 110 may compare the received set of information from the ECUs 104 to ensure that the feature codes 120 from the ECUs 104 match to the acceptable combinations of feature codes 120 specified in the feature dictionary 122.

At operation 408, the central gateway 110 determines whether an issue is identified. In an example, the central gateway 110 may confirm that a single version of a feature codes 120 is seen in the queried feature codes 120. In another example, the central gateway 110 may additionally or alternately confirm that the quantity of ECUs 104 returning the feature code 120 is correct.

At operation 410, the central gateway 110 indicate the issue. For instance, the central gateway 110 may indicate which features are implicated by the issue according to the feature codes 120. The alert may indicate, for example, mismatched versions of software for a feature and/or am incorrect quantity of ECUs 104 for a feature. In some examples, the feature dictionary 122 may be used to provide additional information (if available), such as human readable feature names 210 of the features that may have issues and/or which of the ECUs 104 has the incorrect, missing, or unnecessary software. The issue may be provided as an alert to one or more of the HMI of the vehicle 102, to a mobile device in communication with the vehicle 102, to a remote server over a network, to a server of a service facility, to a diagnostic device connected to the vehicle 102 via the diagnostic port 108, to automatically correct the software configuration, etc. After operation 410, the process 400 ends.

Figure 5:
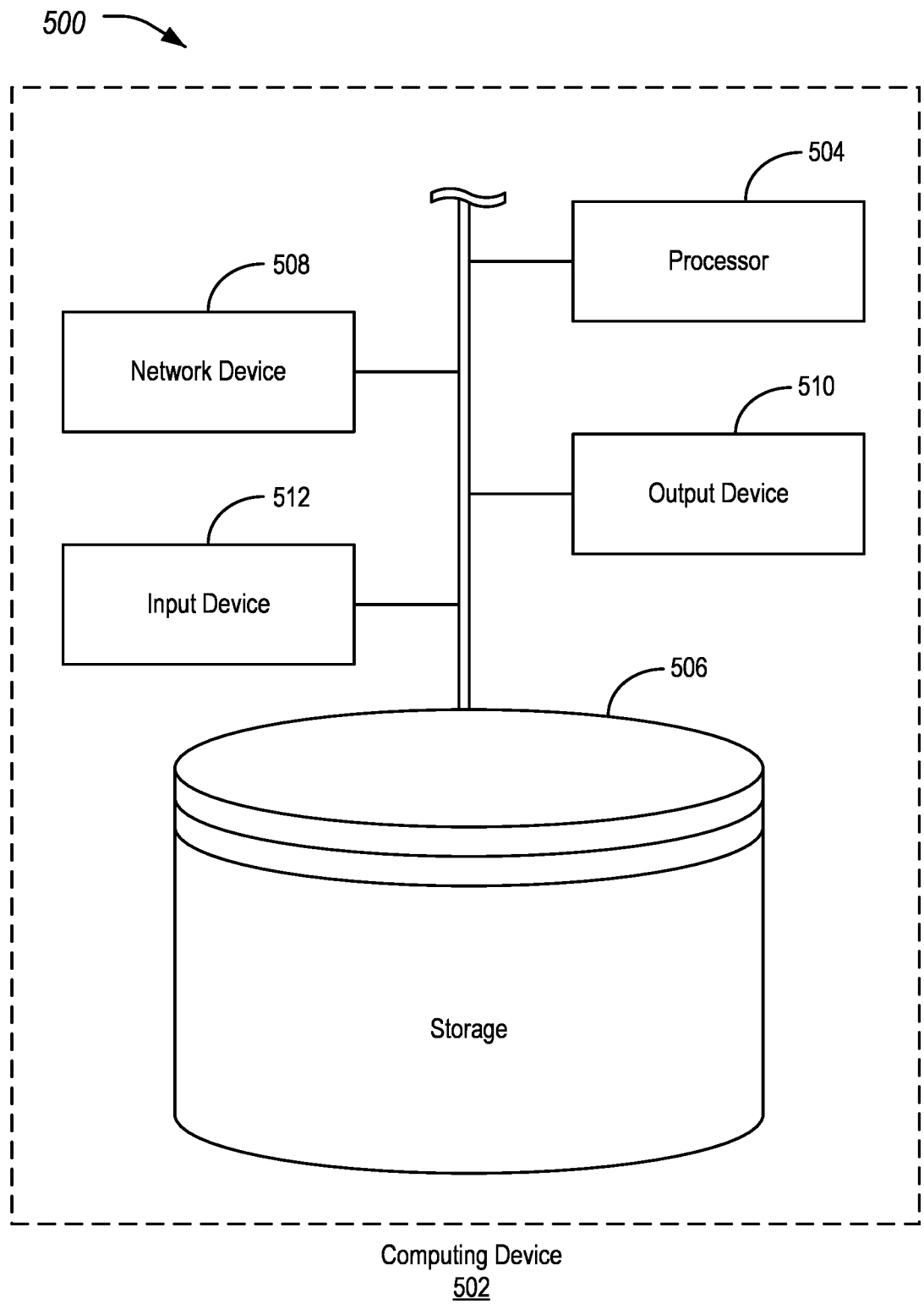
FIG. 5 illustrates an example computing device for tracking vehicle configurations across the vehicle lifecycle.

FIG. 5 illustrates an example computing device 502 for tracking vehicle 102 configurations across the vehicle 102 lifecycle. Referring to FIG. 5, and with reference to FIGS. 1-4, the vehicle 102, ECUs 104, and central gateway 110 may be examples of such computing devices 502. Computing devices 502 generally include computer-executable instructions, such as those of the applications 118, where the instructions may be executable by one or more computing devices 502. Computer-executable instructions may be compiled or interpreted from computer programs created using a variety of programming languages and/or technologies, including, without limitation, and either alone or in combination, Java™, C, C++, C #, Visual Basic, JavaScript, Python, JavaScript, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data, such as the feature codes 120 and the feature dictionary 122, may be stored and transmitted using a variety of computer-readable media.

As shown, the computing device 502 may include a processor 504 that is operatively connected to a storage 506, a network device 508, an output device 510, and an input device 512. It should be noted that this is merely an example, and computing devices 502 with more, fewer, or different components may be used.

The processor 504 may include one or more integrated circuits that implement the functionality of a central processing unit (CPU) and/or graphics processing unit (GPU). In some examples, the processors 504 are a system on a chip (SoC) that integrates the functionality of the CPU and GPU. The SoC may optionally include other components such as, for example, the storage 506 and the network device 508 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or Microprocessor without Interlocked Pipeline Stages (MIPS) instruction set families.

Regardless of the specifics, during operation the processor 504 executes stored program instructions that are retrieved from the storage 506. The stored program instructions, accordingly, include software that controls the operation of the processors 504 to perform the operations described herein. The storage 506 may include both non-volatile memory and volatile memory devices. The non-volatile memory includes solid-state memories, such as Not AND (NAND) flash memory, magnetic and optical storage media, or any other suitable data storage device that retains data when the system is deactivated or loses electrical power. The volatile memory includes static and dynamic RAM that stores program instructions and data during operation of the system 100.

The GPU may include hardware and software for display of at least two-dimensional (2D) and optionally three-dimensional (3D) graphics to the output device 510. The output device 510 may include a graphical or visual display device, such as an electronic display screen, projector, printer, or any other suitable device that reproduces a graphical display. As another example, the output device 510 may include an audio device, such as a loudspeaker or headphone. As yet a further example, the output device 510 may include a tactile device, such as a mechanically raiseable device that may, in an example, be configured to display braille or another physical output that may be touched to provide information to a user.

The input device 512 may include any of various devices that enable the computing device 502 to receive control input from users. Examples of suitable input devices 512 that receive human interface inputs may include keyboards, mice, trackballs, touchscreens, microphones, graphics tablets, and the like.

The network devices 508 may each include any of various devices that enable the described components to send and/or receive data from external devices over networks. Examples of suitable network devices 508 include an Ethernet interface, a Wi-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving large sets of data in an efficient manner.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter. While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure

What is claimed is:

1. A system for tracking controller configuration, comprising:
    electronic control units (ECUs); and
    a central gateway, programmed to:
        maintain, in a storage, a feature dictionary specifying allowable feature code combinations across the ECUs,
        query each ECU of the ECUs for feature codes indicative of elements of functionality implemented by the respective ECU, each feature code corresponding to a target quantity of ECUs involved in implementing the functionality, wherein each of the feature codes embeds the target quantity as a portion of the respective feature code,
        indicate an alert responsive to the query returning a different quantity of ECUs implementing the functionality than the target quantity,
        utilize the feature dictionary to include, in the alert, indications of which of the ECUs are missing feature codes for a feature or which report feature codes that are not specified for the feature, and
        responsive to compatible software being available to address the alert, install a valid set of features per the feature dictionary.

2. The system of claim 1, wherein the target quantity is a suffix of the respective feature code.

3. The system of claim 1, wherein the central gateway in communication with the ECUs over one or more buses, the central gateway being further programmed to query the ECUs for the feature codes over the one or more buses.

4. The system of claim 1, wherein the system is a vehicle, and the central gateway is further programmed to query the ECUs for the feature codes responsive to a key-on of the vehicle.

5. The system of claim 1, wherein the central gateway is further programmed to:
    query the ECUs for the feature codes responsive to a request from a diagnostic device connected to the central gateway via a diagnostic port; and
    indicate the alert as a message sent from the central gateway to the diagnostic device.

6. The system of claim 1, wherein the alert indicates the feature codes for which the target quantity does not match the quantity of ECUs implementing the functionality.

7. The system of claim 1, wherein the feature dictionary includes human readable names for the feature, and the alert includes the human readable names for which the feature codes for which the target quantity does not match the quantity of ECUs implementing the functionality.

8. The system of claim 1, wherein the central gateway is further programmed to provide the alert in a human machine interface (HMI).

9. A method for tracking controller configuration, comprising:
    maintaining, in a storage, a feature dictionary specifying allowable feature code combinations across electronic control units (ECUs);
    querying each ECU of a plurality of ECUs for feature codes indicative of elements of functionality implemented by the respective ECU, each feature code corresponding to a target quantity of ECUs involved in implementing the functionality, wherein each of the feature codes embeds the target quantity as a portion of the respective feature code;

utilizing the feature dictionary to include, in the alert, indications of which of the ECUs are missing feature codes for a feature or which report feature codes that are not specified for the feature;

indicating an alert responsive to the querying returning a different quantity of ECUs implementing the functionality than the target quantity; and responsive to compatible software being available to address the alert, installing a valid set of features per the feature dictionary.

10. The method of claim 9, wherein the target quantity is a suffix of the respective feature code.

11. The method of claim 9, wherein a central gateway in communication with the ECUs over one or more buses, and further comprising querying the ECUs for the feature codes by the central gateway over the one or more buses.

12. The method of claim 9, wherein the ECUs are components of a vehicle, and further comprising querying the ECUs for the feature codes responsive to a key-on of the vehicle.

13. The method of claim 9, further comprising:
querying the ECUs for the feature codes responsive to a request from a diagnostic device; and
indicating the alert as a message to the diagnostic device responsive to the request.

14. The method of claim 9, wherein the alert indicates the feature codes for which the target quantity does not match the quantity of ECUs implementing the functionality.

15. The method of claim 9, wherein the feature dictionary includes human readable names for the feature, and the alert includes the human readable names for which the feature codes for which the target quantity does not match the quantity of ECUs implementing the functionality.

16. The method of claim 9, further comprising, providing the alert in a human machine interface (HMI).

17. A non-transitory computer-readable medium comprising instructions for tracking controller configuration that, when executed by a central gateway in communication over one or more buses with a plurality of ECUs, cause the central gateway to perform operations including to:

maintain, in a storage, a feature dictionary specifying allowable feature code combinations across the ECUs;

query each ECU of a plurality of ECUs for feature codes indicative of elements of functionality implemented by the respective ECU, each feature code corresponding to a target quantity of ECUs involved in implementing the functionality, wherein each of the feature codes embeds the target quantity as a portion of the respective feature code;

indicate an alert responsive to the query returning a different quantity of ECUs implementing the functionality than the target quantity;

utilize the feature dictionary to include, in the alert, indications of which of the ECUs are missing feature codes for a feature or which report feature codes that are not specified for the feature; and responsive to compatible software being available to address the alert, install a valid set of features per the feature dictionary.

18. The non-transitory computer-readable medium of claim 17, further comprising instructions that, when executed by the central gateway, cause the central gateway to perform operations including to provide the alert in a human machine interface (HMI).

* * * * *